United States Patent

[11] 3,597,645

| [72] | Inventors | Heinrich Duffert;<br>Werner Flach, both of Mulheim, Germany |
|---|---|---|
| [21] | Appl. No. | 836,299 |
| [22] | Filed | June 25, 1969 |
| [45] | Patented | Aug. 3, 1971 |
| [73] | Assignee | Siemens Aktiengesellschaft<br>Berlin, Germany |
| [32] | Priority | June 26, 1968 |
| [33] | | Germany |
| [31] | | P 17 63 579.9 |

[54] LIQUID COOLING SYSTEM FOR STACKS OF STATOR LAMINATIONS OF ELECTRICAL MACHINERY
6 Claims, 5 Drawing Figs.

[52] U.S. Cl. .................................................. 310/54, 310/65
[51] Int. Cl. ............................................... H02k 9/19
[50] Field of Search .......................................... 310/54, 64, 65, 57, 58, 59, 61

[56] References Cited
UNITED STATES PATENTS

| 2,282,283 | 5/1942 | Henter | 310/65 |
| 2,618,756 | 11/1952 | Fechheimer | 310/54 |
| 3,447,002 | 5/1969 | Ronnevig | 310/65 X |

FOREIGN PATENTS

| 484,371 | 5/1938 | Great Britain | 310/65 |

Primary Examiner—D. F. Duggan
Attorneys—Curt M. Avery, Arthur E. Wilfond, Herbert L. Lerner and Daniel J. Tick ABSTRACT: Radially extending cooling slots are provided between adjacent ones of a plurality of stack portions intermediate the end pressure plates of an electrical machine at least in the vicinity of the end pressure plates. Each of a plurality of liquid chamber sections is positioned in a corresponding one of the cooling slots in close thermal contact with each of the corresponding adjacent stack portions. Each of the sections is substantially a sector of an annulus adapted to form an annulus with others of the sections. Each of the sections has teeth formed therein in its area closer to the axis of the annulus. Cooling liquid is supplied to and removed from a plurality of cooling paths formed in each of the sections including the teeth thereof.

3,597,645

LIQUID COOLING SYSTEM FOR STACKS OF STATOR LAMINATIONS OF ELECTRICAL MACHINERY

DESCRIPTION OF THE INVENTION

The present invention relates to a liquid cooling system for electrical machinery. More particularly, the invention relates to a liquid cooling system for stacks of stator laminations of electrical machinery such as, for example, turbogenerators. Increasing unit efficiency of electrical machines, and particularly of turbogenerators, produces an increase in the requirements for dissipating heat. Large, well utilized machinery is therefore cooled with respect to its stator and rotor windings. Such cooling is undertaken directly by the utilization of liquid or gas. The stacks of stator laminations must also be cooled with liquid or gas. In high efficiency or high output turbogenerators, special attention must be paid to the teeth between the slots, since high field concentrations, and therefore considerable heat, occur at said teeth. More particularly, the end teeth of the stack of stator laminations, which are the teeth between the slots in the vicinity of the end pressure plates, must be cooled. This is a requirement in gas-cooled as well as liquid-cooled machines.

The principal object of the present invention is to provide a new and improved liquid cooling system for stacks of stator laminations of electrical, which cooling system adheres to the requirements of a suitable and desirable cooling system of such type and cools such stacks with efficiency, effectiveness and reliability.

An object of the present invention is to provide a liquid cooling system for stacks of stator laminations of electrical machinery, which system is of simple structure, involves little manufacturing expense and provides highly effective cooling of the teeth.

In accordance with the present invention, a liquid cooling system for stacks of stator laminations of a turbogenerator having a stack of stator laminations divided by peripherally extending radial cooling slots into a plurality of axially adjacent component stacks of stator laminations, comprises a plurality of flat hollow metal chamber sections adjusted to the laminations of the stack of stator laminations for cooling the stack of stator laminations. The chamber sections are inserted in the cooling slots in good thermal contact with the stack of stator laminations. Each of the chamber sections comprises substantially a sector of an annulus comprising a pair of spaced parallel planar plates having yoke portions and alternate grooves and tooth portions formed therein in their area closer to the axis of the annulus. Inlet means supplies cooling liquid to the chamber section and outlet means removes cooling liquid from the chamber section in a different area from that of the inlet means. The inlet and outlet means are connectable to a liquid coolant supply system. A plurality of cooling paths re formed therein and extend in zigzag configuration from the inlet means via the yoke and tooth portions to the outlet means. Metal portions between the plates surround the cooling paths and absorb the axial pressure exerted by the stack of stator laminations on the cooling system. A plurality of the chamber sections is adapted to be peripherally joined with each other in a cooling slot to form an annulus. Each of the chamber sections has bores formed through the plates thereof for guiding therethrough tension rods of the stack of stator laminations and a liquidtight sealing path enclosing each of the bores and affixed to the plates and sealing the cooling system in the area of the bores from the outside. The liquid cooling system comprises a plurality of ledges forming the cooling paths and the metal portions surrounding the cooling paths of each of the chamber sections. The edges are radially extending and axially aligned between the plates and comprise outer ledges in liquidtight relation with the plates and form an outer wall for sealing the interior of each chamber section from the outside and inner ledges for guiding liquid coolant in each chamber section in a zigzag path from the inlet means to the outlet means via the yoke and tooth portions.

A plurality of the chamber sections are positioned tangentially to form an annulus. A liquid coolant duct is provided above the annulus and a liquid coolant duct is provided below the annulus both extending in the longitudinal direction of the stack of stator laminations. The upper coolant duct supplies liquid coolant to the inlet means of the chamber sections and the lower coolant duct removes liquid coolant from the outlet means of the chamber sections. The liquid coolant flows via the pressure paths formed by the inner and outer ledges in the chamber sections between the inlet means and the outlet means thereof.

The turbogenerator has a pair of end pressure plates and the stack of stator laminations extend intermediate the end pressure plates. The annulus of chamber sections is inserted in a cooling slot of the stack of stator laminations closely adjacent an end pressure plate. An annular inlet distribution duct substantially coaxial with the annulus is connected to the upper coolant duct. An annular outlet distribution duct is connected to the lower coolant duct. A plurality of radially extending ducts connect the inlet means of the chamber sections of the annulus to the inlet distribution duct in parallel and connect the outlet means of the chamber sections of the annulus to the outlet distribution duct in parallel.

The annulus of chamber sections is inserted in a cooling slot of the stack of stator laminations spaced from the end pressure plates. Half the chamber sections of the annulus are positioned tangentially to form half an annulus and the other half the chamber sections of the annulus are positioned tangentially to form half an annulus. The chamber sections of each half an annulus are connected for liquid coolant flow in series. Ducts connect the inlet means of the uppermost chamber section of each half annulus to the upper coolant duct and connect the outlet means of the lowermost chamber section of each half annulus to the lower coolant duct. The two half annuli are connected to each other in parallel with regard to liquid coolant flow.

Thermal insulating material is positioned in the spaces between the substantially radially extending portions of the outer ledges which are in contact in peripheral direction to prevent direct metallic contact between annuli formed of chamber sections and electrically insulating material in the radially extending ducts and other connecting ducts.

In order that the invention may be readily carried into effect, it will now be described with reference to the accompanying drawings, wherein:

FIG. 2a is a sectional view taken along the lines IIa-IIa of FIG. 2;

Figure 3:
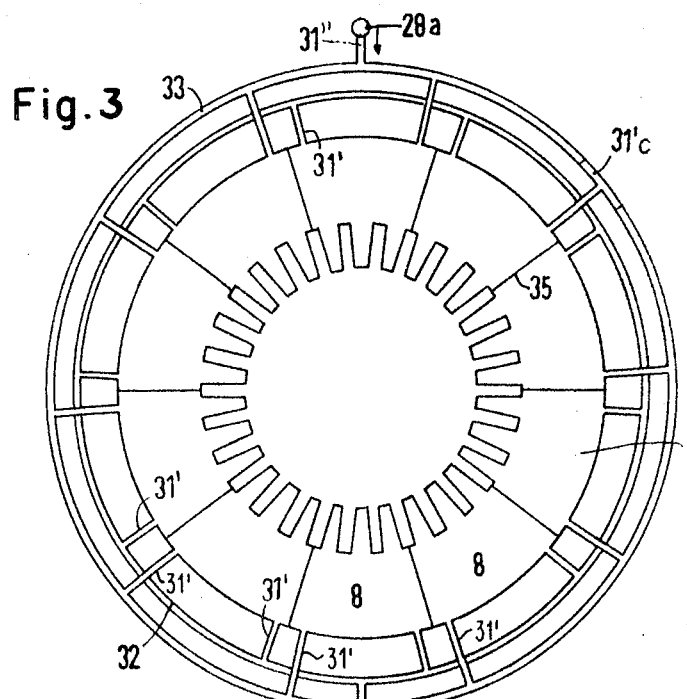
Figure 4:
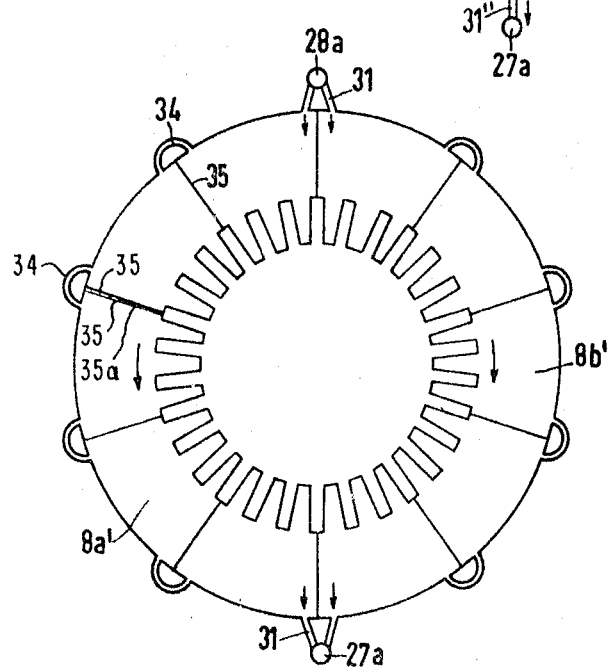

FIG. 3 is a schematic diagram of a plurality of liquid chamber sections of the liquid cooling system of the present invention arranged in parallel with a common inlet and outlet to form an annulus; and FIG. 4 is a schematic diagram of a plurality of liquid chamber sections of the liquid cooling system of the present invention, half of which sections are arranged in series and the other half of which sections are arranged in series to form an annulus.

In the FIGS., the same components are identified by the same reference numerals.

Figure 1:
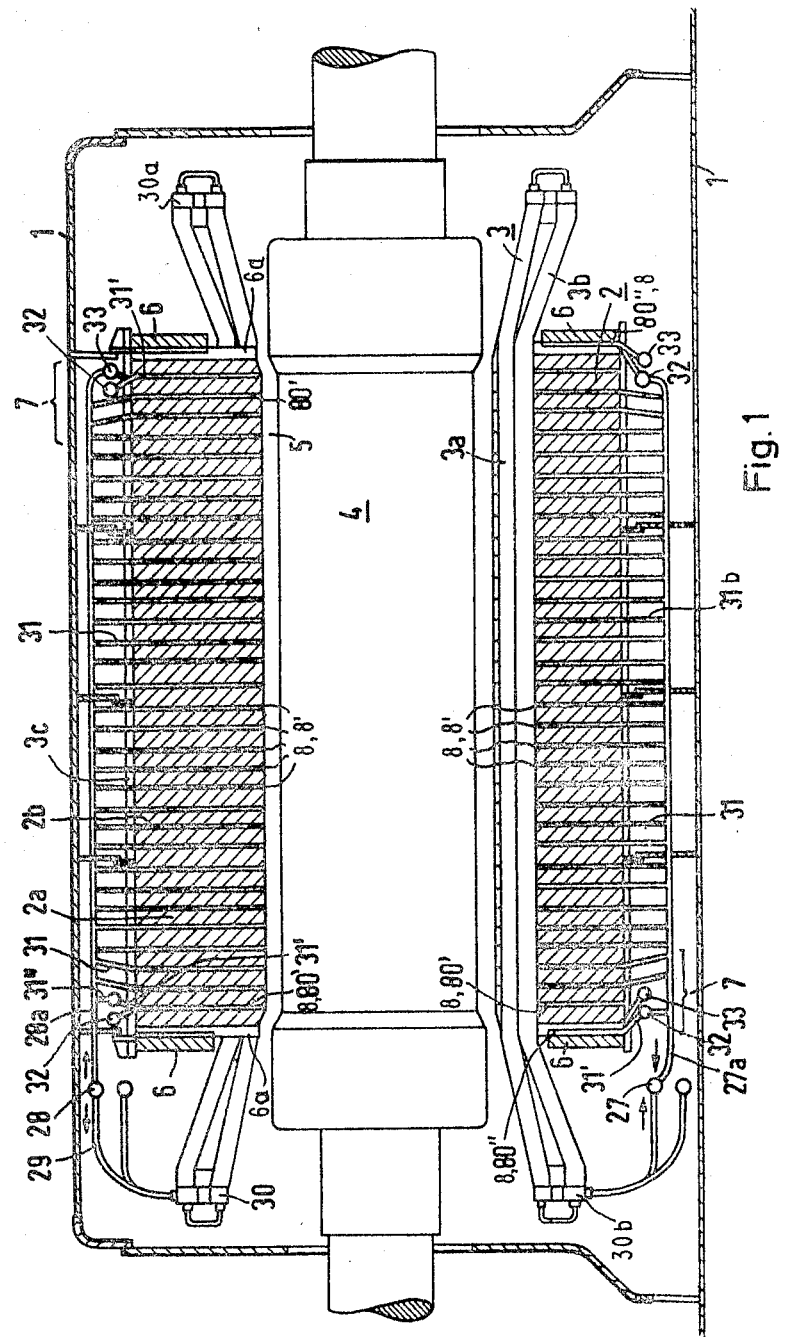
FIG. 1 is a schematic diagram, partly in axial section, of a turbogenerator including in embodiment of the liquid cooling system of the present invention.

In FIG. 1, a turbogenerator has a housing or casing 1. The turbogenerator comprises stack 2 of stator laminations and a stator winding 3. The stator winding 3 is provided, in a known manner, with straight groove portions 3a embedded in axial stator grooves which bend outwardly at their end turns 3b. The stator winding 3 may be cooled directly by gas or by liquid. The rotor 4 is positioned with an air gap 5 between said rotor and the stator winding.

The rotor 4 is positioned in an axial bore formed through the stack 2 of stator laminations. The stack 2 of stator laminations has a plurality of bars 3c for maintaining said laminations in position. A pair of end pressure plates 6 and circumferentially spaced pressure fingers 6a are provided at the opposite axial ends of the stack 2 of stator laminations.

The stack 2 of stator laminations is subdivided into stack portions 2a. The stack portions 2a are provided in the same manner utilized for gas cooling. Each of the stack portions 2comprises a plurality of stacked laminations or sheets which, hen axially adjacent each other, form radial cooling slots 2b between said stack portions. The radial cooling slots 2b are at least provided in the vicinity of the end pressure plates 6, preferably in the axial end areas 7.

Figure 2:
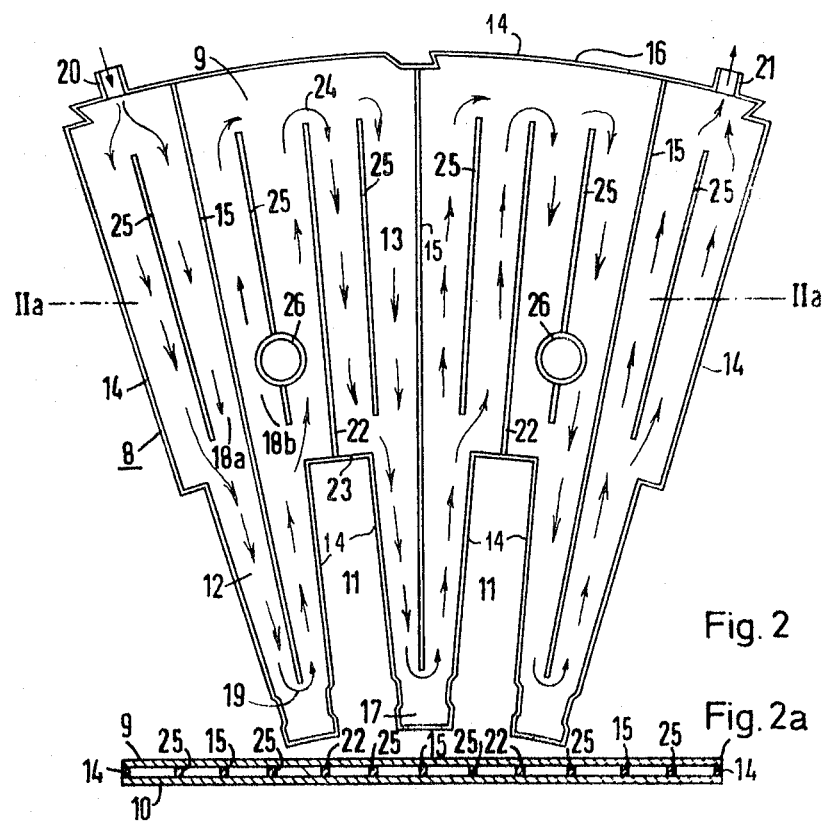
FIG. 2 is a schematic diagram in top, open view, of a preferred embodiment of a liquid chamber section of the liquid cooling system of the present invention.

A plurality of liquid chamber sections 8, as shown in FIGS. 2, 3 and 4 are provided in the radial cooling slots 2b, particularly in the axial end areas 7. Each of the liquid chamber sections 8 is positioned in a corresponding one of he cooling slots 2b in close thermal contact with each of the corresponding adjacent stack portions 2a. The liquid chamber sections 8 are provided in the axial end areas 7, especially when the stack 2 of stator laminations includes axial cooling ducts for liquid or gas cooling, so that additional cooling provisions, utilizing the liquid chamber sections, are required only for the end teeth of said stack of stator laminations.

Another cooling system involves positioning the liquid chamber sections 8 in the axial end areas 7 and providing conventional gas cooling in the radial cooling slots 2b for the remaining laminations. The liquid chamber sections 8 may also be distributed over the entire axial length of the stack of stator laminations, as illustrated in FIG. 1, and they may either completely cool said stack of stator laminations, or at least cool the areas of the teeth, if the remaining portions are separately cooled by axial cooling ducts.

As shown in FIGS. 2 and 2a, the liquid chamber sections 8 are formed essentially in the same configuration as the laminations. Each of the liquid chamber sections 8 is substantially a sector of an annulus. Each of the liquid chamber sections 8 is adapted to form an annulus with the others of the liquid chamber sections. The sections may be joined in a manner whereby their side plates 9 and 10 (FIG. 2a) are in close thermal contact with the adjacent stack portions 2a of laminations. There is no need for separate end plates, since the function of the separate end plates is undertaken by the liquid chamber sections themselves, and there is a direct heat transfer.

As shown in FIGS. 2 and 2a, each liquid chamber section 8 has substantially planar spaced parallel side plates 9 and 10. Each of the side plates 9 and 10 has grooves 11 (FIG. 2) punched out of it to form teeth 12 between said grooves. The grooves 11 and the teeth 12 are formed in the area of each side plate 9 and 10 closest to the axis of the annulus. The grooves 11 and teeth 12 extend radially relative to the axis of the annulus and they are adjacent the yoke or core portion 13 of the side plates 9, 10.

At least one of the side plates 9 and 10 has a plurality of inner ledges or yokes 15 (FIG. 2). The yokes 15 are in liquidtight relation with the plates 9 and 10 and form cooling paths within the liquid chamber sections for a liquid coolant which serve the teeth formed in the liquid chamber section 8. In the view of FIG. 2, the side plate 10 is removed, so that the side plate 9 and the yokes 15 and the core portion 13 are clearly shown in said FIG.

In the outer area of the chamber 8 there are outer bounding ledges or yokes 14, comprising radially and circumferentially extending ledges or yokes, enclosing liquidtight the inside of the chamber 8. The yokes 14 and 15 may be affixed to the side plates 9 and 10 by any suitable means such as, for example, welding or hard soldering. The cooling paths, provided by the various outer and inner yokes 14 and 15, guide the liquid coolant throughout the entire liquid chamber section, from its outer periphery, farthest from the axis of the annulus, into the end area 17 of each of the teeth 12. Each tooth 12 and the adjacent radially extending core or yoke portion 13 is provided with two chamber areas 18a and 18b, as shown in FIG. 2. The chamber areas 18a and 18b of each of the teeth 12 are joined in the area of the end point 19 of each of the yokes 15 closest to the axis of the annulus. There are further inner yokes or ledges 22 and 25, called intermediate yokes and described hereinafter.

A liquid coolant is supplied via an inlet duct 20 at one end of the liquid chamber section 8 at its periphery 16. The liquid coolant, whose flow is indicated by arrows, flows through the outermost radial area defined by the yokes 14 and 15. The radial area defined by the yokes 14 and 15 which is farthest to the left encompasses the chamber area 18a. The liquid coolant flows radially toward the axis of the annulus, through the left radial half of the tooth 12, farthest to the left in FIG. 2, around the end 19 of the yoke 15 and then radially away from the axis of the annulus. The liquid coolant then flows through the radial areas formed by the right half of the tooth 12 farthest to the left and the yokes 15 and 22. The liquid coolant flows around the end 24 of the yoke 22 farthest from the axis of he annulus and then flows radially towards that axis through the radial areas between the yokes 22 and 15. The liquid coolant continues to flow in this manner until it reaches the outlet duct 21, where it is removed from he liquid chamber section.

A plurality of intermediate edges or yokes 2 and 25 are provided in each radial area formed by a major yoke 14 or 15. Each of the intermediate yokes 22 extends substantially radially from the base 23 of a corresponding one of the grooves 11 formed between the teeth 12. Each of the intermediate yokes 22 extends to a point short of the periphery 16 of the liquid chamber section. A plurality of intermediate yokes 25 are provided extending substantially radially and substantially equidistantly from each other. Each of the intermediate yokes 25 is provided between a pair of major yokes 14 and 15 or a major yoke 15 and intermediate yoke 22. Each of the intermediate yokes 25 extends to a point spaced from the periphery 16 and spaced from the circle defining the bases 23 of the grooves 11 formed between the teeth 12.

The aforedescribed pressure and cooling yokes or ledges absorb the pressure forces exerted upon the stack 2 of stator laminations and function as spacers. The major yokes 14 and 15 and the intermediate yokes 22 and 25 therefore comprise stable material such as, for example, stainless steel. When these yokes also function to seal off the liquid chamber section, they must be provided in liquidtight relation to the side plates 9 and 10. The ducts 25, as well as the ducts 15 and 22, must be positioned in accordance with their desired function, and are not required to be in liquidtight association with the side walls 9 and 10.

Separate sealed tubes 26, surrounding bores or apertures 26a are provided, in liquidtight relation, of each of the side plates 9 and 10. The bores or apertures 26a are adapted to accommodate tension rods or connecting rods (not shown in FIGS. 2 or 2a for maintaining the stack 2 laminations stator laminations in position. The tension or connecting rods extend substantially parallel to the axis of the rotor, which axis is coincident with the axis of the annulus. The tubes 6 of the bores may also function as spacers, absorbing pressure forces of the stack 2.

As seen from FIG. 2, liquid coolant flows through the entire interior of the liquid chamber section 8, so that an annulus formed by a plurality of liquid chamber sections may be utilized to provide the entire cooling of a stack of stator laminations. Each liquid chamber section 8 may be provided with a plurality of openings, instead of the two ducts 20 and 21 shown in FIG. 2, in accordance with its extension in peripheral or radial directions and the desired degree of cooling. Furthermore, groups comprising the chamber areas 18a and 18b of each tooth 12 may be provided with a liquid coolant flow in parallel or series-parallel arrangement, instead of the series flow indicated in FIG. 2. The same flow arrangements apply for a plurality of liquid chamber sections 8, as hereinafter described.

In order to maintain eddy current losses in the liquid chamber sections 8 small, said liquid chamber sections preferably comprise nonmagnetic material having a low electrical conductivity value. Suitable material for the liquid chamber section 8 is brass or nonmagnetic steel, although brass is preferable, due to its better workability, especially when it is not subjected to great mechanical stress. If eddy current losses in the teeth 12 may be reduced by the utilization of copper shielding, it is preferable to make liquid chamber section 8 of nonmagnetic material having good electrical conductivity. A suitable material is "Cuprotherm," for example.

A double row of bounding major yokes may be utilized instead of the radially outermost bounding major yoke 14 of FIG. 2. This provides an air chamber between the parallel outer bounding yokes 14. The air chamber enhances the liquidtight nature of the seal and may be utilized to indicate any leakage which may occur.

In FIG. 1, the liquid cooling system has an inner ring 27 and an outer ring 28, coaxially provided, one within the other. Liquid coolant is supplied via the outer ring 28 and is removed via the inner ring 27. The rings 27 and 28 supply the stator winding 3 of the electrical machine of FIG. 1 with liquid coolant, in a known manner, via connecting ducts 29. The connecting ducts 29 are made from electrically insulating material. The liquid coolant enters or leaves cooling ducts in the conductor bars of the stator winding at one end of the machine via a plurality of heads 30, 30b respectively and is returned from one conductor bar to another conductor bar at the other end of the machine via heads 30a. The outlet water which is collected in the annular manifold 27 is passed through suitable cooling apparatus (not shown) and then returned to the other annular manifold 28. It is to be understood that the heads connect the cooling ducts of the shown conductor bars with cooling ducts of the not shown other conductor bars which are tangentially in the neighborhood of the shown conductor bars.

The radial cooling slots 2b (FIG. 1) formed between the stack portions 2, re distributed over the axial length of the machine nd are provided with liquid chamber sections 8' for cooling the stack 2 of stator laminations (FIGS. 1 and 4). The liquid chamber sections 8' are formed in annuli, as shown in FIG. 4. Each annulus comprises a plurality of liquid chamber sections 8, of the aforedescribed type. Each annulus 8' of liquid chamber sections 8, as shown in FIG. 4, is supplied with liquid coolant via an axially extending inlet duct 28a and the liquid coolant is removed from the annulus via an axially extending outlet duct 27a. The inlet duct 28a opens into the upstream side of the internal cooling ducts of each of the annuli 8', each comprising plurality of the liquid chamber sections 8 forming the annulus 8', via the upper inlet pipes 31. The outlet duct 27a is connected to the downstream side of he internal cooling ducts of each of the annuli 8' by the outlet pipes 31 shown below in FIG. 4.

The pipes or shunts 31 are preferably of electrically insulating material such as, for example, tetrafluorethylene. In order to provide particularly intensive cooling of the teeth of each of the liquid chamber sections forming the annulus 80', and the annulus 80'' on both ends of the machine (FIG. 1), the ends most closely adjacent the end pressure plates 6, are provided with a special inlet ring duct 33 and outlet ring duct 32, the ring ducts 33, 32, respectively, being connected to the inlet duct 28a and outlet duct 27a, respectively, by pipes 31''. The inlet ring duct 33 and the outlet ring duct 32 are coupled to each of the liquid chamber sections 8 via terminal duct 31'. The inlet ring duct 33 and the outlet ring duct 32 (FIG. 3) coaxially surround the annulus 80' (and 80'') formed of liquid chamber sections 8. The annulus 80' shown in FIG. 1 is the same as the annulus 80', shown in FIG. 3. The liquid chamber sections 8 of the annulus 80'' abut only the pressure plates 6, however, and not the teeth of the stack 2 of laminations. In order to provide better orientation, the terminal ducts 31' for the ring ducts 32 and 33 of the annulus 80' are shown only at the top of FIG. 1 and the terminal ducts 31' for the ring ducts 32 and 33 of the annulus 80'' are shown only at the bottom of FIG. 1. The terminal ducts 31' and parts of the ring ducts 32, 33, respectively, may be combined into a single component of T-shaped configuration comprising electrically insulating material, as shown in FIG. 3 at 31'c. Although the ring ducts 32 and 33 are shown with the same diameter in FIG. 1, they are shown with different diameters in FIG. 3, in order to better illustrate the flow of the liquid coolant. If a compact construction, relative to the directions of the axis, is desired, however, the diameters of the ring ducts 32 and 33 are made different and are actually provided as shown in FIG. 3.

FIG. 3 illustrates that the cooling of the teeth may be further intensified by connecting the liquid chamber sections 8 forming the annulus 80' to the inlet ring duct 33 and the outlet duct 32 in parallel. In accordance with a preferred embodiment of the present invention, the liquid cooling supply and discharge system may be connected or coupled to the remaining annuli 8' of the stack 2 of he annulus in series-parallel arrangement of the liquid chamber sections 8, as shown in FIG. 4.

In the embodiment of FIG. 4, the annulus 8' is divided into two halves 8a' and 8b', which are coupled to each other in parallel. The liquid chamber sections of each of the halves 8a' and 8b' are coupled to each other in series by external ducts 34. In the embodiment of FIG. 4, the liquid coolant is supplied via the inlet duct 28a and a pair of shunts 31 at the upper portion of the stack of laminations, to a liquid chamber section of the half 8a' and to a liquid chamber section of the half 8b'. The liquid coolant flows in a counterclockwise direction through the half 8a' and in a clockwise direction through the half 8b', and is removed via the shunts 31 and the outlet duct 27a at the lower part of the stack of laminations.

It may be expedient to provide additional electrical insulation in all areas where eddy currents are produced by principal or stray fields of the machine. Additional insulation may be provided especially between adjacent surfaces 35 (FIGS 3 and 4) of the liquid chamber sections of the annulus as indicated at 35a in FIG. 4 only between two liquid chamber sections. It is to be understood, that in the aforementioned case between each of the adjacent liquid chamber sections in FIGS. 3 and 4 isolation layers 35aare provided. In this case ll of he external ducts 34 are preferably of thermally insulating material.

It is obvious that the liquid cooling system of the present invention, comprising annuli each comprising plurality of liquid chamber sections, permits a variety of connections or couplings. Thus, the desired flow pattern of he liquid coolant may be developed in axial directions, individually and in accordance with specific requirements.

Since liquid-cooled turbogenerators have liquid supply systems, the liquid cooling system of the present invention may be utilized without the necessity for providing much additional equipment. A considerable advantage of the liquid cooling system of the present invention is that the liquid chamber sections are manufactured as modules, which are readily and facilely installed during the stacking of the laminations and may, in fact, be installed in the same manner as the laminations or sheets, themselves. Furthermore, as illustrated in the FIGS., the flow connections of the liquid coolant are simply effected.

In machines which are cooled by liquid at the stator and the rotor, the utilization of the liquid chamber sections of the present invention, positioned in radial cooling slots, provides the advantage that said liquid chamber sections may be connected directly to a liquid storage area with facility and convenience, in a simple manner. The liquid cooling system of the present invention is thus readily adaptable, with a minimum of difficulty to existing systems.

While the invention has been described by means of specific examples and in specific embodiments, we do not wish to be limited thereto, for obvious modifications will occur to those skilled in the art without departing from the spirit and scope of the invention.

We claim:

1. A liquid cooling system for stacks of stator laminations of a turbogenerator having a stack of stator laminations divided by peripherally extending radial cooling slots into a plurality of axially adjacent component stacks of stator laminations, a plurality of flat hollow metal chamber sections adjusted to the laminations of the stack of stator laminations for cooling said stack of stator laminations, the chamber sections being inserted in the cooling slots in good thermal contact with said stack of stator laminations, each of the chamber sections comprising substantially a sector of an annulus comprising a pair of spaced parallel planar plates having yoke portions and alternate grooves and tooth portions formed therein in their area closer to the axis of the annulus; inlet means for supplying cooling liquid to the chamber section, outlet means for removing cooling liquid from the chamber section in a different area from that of the inlet means, said inlet and outlet means being connectable to a liquid coolant supply system, a plurality of cooling paths formed therein and extending in zigzag configuration from the inlet means via the yoke and tooth portions to the outlet means, and metal portions between the plates surrounding the cooling paths for absorbing the axial pressure exerted by the stack of stator laminations on the cooling system, a plurality of said chamber sections being adapted to be peripherally joined with each other in a cooling slot to form an annulus, each of the chamber sections having bores formed through the plates thereof for guiding therethrough tension rods of the stack of stator laminations and a liquidtight sealing path enclosing each of the bores and affixed to said plates and sealing the cooling system in the area of said bores from the outside, said liquid cooling system comprising a plurality of ledges forming the cooling paths and the metal portions surrounding said cooling paths of each of the chamber sections, said ledges being radially extending and axially aligned between the plates and comprising outer ledges in liquidtight relation with the plates and forming an outer wall for sealing the interior of each chamber section from the outside and inner ledges for guiding liquid coolant in each chamber section in a zigzag path from the inlet means to the outlet means via the yoke and tooth portions.

2. A liquid cooling system for stacks of stator laminations of turbogenerator having a stack of stator laminations divided by peripherally extending radial cooling slots into a plurality of axially adjacent component stacks of stator laminations, a plurality of flat hollow metal chamber sections adjusted to the laminations of the stack of stator laminations for cooling said stack of stator laminations, the chamber sections being inserted in the cooling slots in good thermal contact with said stack of stator laminations, each of the chamber sections comprising substantially a sector of an annulus comprising a pair of spaced parallel planar plates having yoke portions and alternate grooves and tooth portions formed therein in their area closer to the axis of the annulus, inlet means for supplying cooling liquid to the chamber section, outlet means for removing cooling liquid from the chamber section in a different area from that of the inlet means, said inlet and outlet means being connectable to a liquid coolant supply system, plurality of cooling paths formed therein and extending in zigzag configuration from the inlet means via the yoke and tooth portions to the outlet means, and metal portions between the plates surrounding the cooling paths for absorbing the axial pressure exerted by the stack of stator laminations on the cooling system, plurality of said chamber sections being positioned tangentially and peripherally joined with each other in a cooling slot to form an annulus, liquid coolant duct above the annulus and a liquid coolant duct below the annulus both extending in the longitudinal direction of the stack of stator laminations, the upper coolant duct supplying liquid coolant to the inlet means of the chamber sections and the lower coolant duct removing liquid coolant from the outlet means of the chamber sections, the liquid coolant flowing via the pressure paths formed by the inner and outer ledges in the chamber sections between the inlet means and outlet means thereof, said liquid cooling system comprising plurality of edges forming the cooling paths and the metal portions surrounding said cooling paths of each of the chamber sections, said edges being radially extending and axially aligned between the plates and comprising outer ledges in liquidtight relation with the plates and forming an outer wall for sealing the interior of each chamber section from the outside and inner ledges for guiding liquid coolant in each chamber section in a zigzag path from the inlet means of the outlet means via the yoke and tooth portions.

3. A liquid cooling system s claimed in claim 2, wherein the turbogenerator has a pair of end pressure plates and the stack of stator laminations extends intermediate the end pressure plates and wherein the annulus of chamber sections is inserted in a cooling slot of the stack of stator laminations closely adjacent an end pressure plate, and further comprising an annular inlet distribution duct substantially coaxial with the annulus and connected to the upper coolant duct, an annular outlet distribution duct connected to the lower coolant duct and a plurality of radially extending ducts connecting the inlet means of the chamber sections of the annulus to the inlet distribution duct in parallel and connecting the outlet means of the chamber sections of the annulus to the outlet distribution duct in parallel.

4. A liquid cooling system as claimed in claim 3, further comprising thermal insulating material positioned in the spaces between the substantially radially extending portions of the outer ledges which are in contact in peripheral direction to prevent direct metallic contact between annuli formed of chamber sections and electrically insulating material in the radially extending ducts and other connecting ducts.

5. A liquid cooling system as claimed in claim 2, wherein the annulus of chamber sections is inserted in a cooling slot of the stack of stator laminations spaced from he end pressure plates and wherein half the chamber sections of the annulus are positioned tangentially to form half an annulus and the other half the chamber sections of the annulus are positioned tangentially to form half an annulus, the chamber sections of each half an annulus being connected for liquid coolant flow in series, and further comprising ducts connecting the inlet means of the uppermost chamber section of each half annulus to the upper coolant duct and connecting he outlet means of the lowermost chamber section of each half annulus to the lower coolant duct, the two half annuli being connected to each other in parallel with regard to liquid coolant flow.

6. A liquid cooling system as claimed in claim 5, further comprising thermal insulating material positioned in the spaces between the substantially radially extending portions of the outer ledges which are in contact in peripheral direction to prevent direct metallic contact between annuli formed of chamber sections and electrically insulating material in the radially extending ducts and other connecting ducts.